United States Patent
Tonev et al.

(10) Patent No.: US 7,873,678 B2
(45) Date of Patent: Jan. 18, 2011

(54) LIGHTWEIGHT DIRECTORY ACCESS PROTOCOL (LDAP) SCHEMA DEFINITION USING EXTENSIBLE MARKUP LANGUAGE (XML)

(75) Inventors: Christo T. Tonev, San Jose, CA (US); Saurabh Shrivastava, Fremont, CA (US); Ashish Kolli, Redwood City, CA (US)

(73) Assignee: Oracle International Corporation, Redwood Shores, CA (US)

(*) Notice: Subject to any disclaimer, the term of this patent is extended or adjusted under 35 U.S.C. 154(b) by 688 days.

(21) Appl. No.: 11/830,644

(22) Filed: Jul. 30, 2007

(65) Prior Publication Data
US 2009/0037446 A1    Feb. 5, 2009

(51) Int. Cl.
*G06F 17/30* (2006.01)
(52) U.S. Cl. .................. 707/805; 707/610; 707/640; 707/674; 707/736; 707/791; 707/802; 707/809; 345/629; 709/223; 709/224; 709/217; 709/218; 705/20; 705/23; 705/26; 711/100
(58) Field of Classification Search ............... 707/610, 707/640, 674, 736, 791, 802, 809, 759, 999.004, 707/999.101, 999.102, 999.103, 999.107; 345/629; 709/328, 223, 224, 217, 218; 715/511; 705/20, 23, 26; 711/100
See application file for complete search history.

(56) References Cited

U.S. PATENT DOCUMENTS

2001/0034733 A1* 10/2001 Prompt et al. ............... 707/102

OTHER PUBLICATIONS

Title: Lightweight Directory Access Protocol Author: Wahl et al. Date: 1997 Pertinent Pages: 40 Publisher: ietf.*

Title: The LDAP Data Interchange Form Author: Good Date: 2000 Pertinent Pages: 18 Publisher: ietf.*

Title: XML Author: Marsh et al. Date: 2005 Pertinent Pages: 9 Publisher: www.w3.org Version: 1.0.*

Wahl, M. et al. "Lightweight Directory Access Protocol (v3): Attribute Syntax Definitions", Dec. 1997, http://www.ietf.org/rfc/rfc2252.txt?number=2252, pp. 22.

Findlay, A. "LDAP Schema Design", Feb. 2005, pp. 21.

Good, G. "The LDAP Data Interchange Format (LDIF)—Technical Specification", Jun. 2000, http://www.ietf.org/rfc/rfc2849.txt, pp. 10.

"Chapter 8. LDAP LDIF", http://www.zytrax.com/books/ldap/ch8/, Jan. 18, 2006, pp. 13.

(Continued)

*Primary Examiner*—Syling Yen
(74) *Attorney, Agent, or Firm*—Silicon Valley Patent Group LLP; Omkar Suryadevara

(57) ABSTRACT

A computer receives a schema that lacks information required by a directory access protocol (e.g. LDAP) and automatically generates information that conforms to the directory access protocol and supplies the generated information as output in a new schema. Such automatic schema transformation allows a human who is creating the schema, to enable usage of the directory access protocol to interface with a directory implementing the schema, without knowing the directory access protocol. The computer of some embodiments receives the schema being input, in a predetermined human-readable language (e.g. XML). Hence, an XML developer who lacks knowledge of LDAP can use traditional XML tools to prepare an LDAP-incompatible schema, for use in implementing a directory (e.g. address book) that is accessed by an LDAP client (e.g. cell phone) via an LDAP server. The new schema can be output in any form (e.g. text/binary) and in any language.

13 Claims, 13 Drawing Sheets

OTHER PUBLICATIONS

"Directory Services Markup Language v2.0", Dec. 18, 2001, pp. 26.

W3C standard, XML Schema, http://www.w3.org/XML/Schema, Jun. 22, 2007, pp. 27.

W3C standard, XML Schema, http://www.w3.org/2001/XMLSchema, Sep. 12, 2005, pp. 1.

XML Schema Part 0: Primer Second Edition, W3C Recommendation Oct. 28, 2004, http://www.w3.org/TR/xmlschema-0/, pp. 81.

Tauber, J. et al. "Directory Services Markup Language" (DSML), Dec. 2, 1999, http://www.dsmltools.org/dsml.org/dsml.html, pp. 7.

Leach, P. et al., "A UUID URN Namespace draft-mealling-uuid-urn-03.txt", http://tools.ietf.org/id/draft-mealling-uuid-urn-03.txt, Jan. 2004, pp. 50.

Ort, E. et al., "JavaTM Architecture for XML Binding (JAXB)", http://java.sun.com/developer/technicalArticles/WebServices/jaxb/, Mar. 2003, pp. 13.

* cited by examiner

FIG. 3B

```xml
<?xml version="1.0" encoding="UTF-8" ?>
<ObjectClasses xmlns:xsi="http://www.w3.org/2001/XMLSchema-instance"
            xsi:schemaLocation="http://www.oracle.com/xmlns/idm/
extensions idm-extensions.xsd"              322A-N    322A-O              322A-D
            xmlns="http://www.oracle.com/xmlns/idm/extensions">
    <ObjectClass Name="UserDevice"
ObjectIdentifier="2.16.840.1.113894.9999.1" Description="description of
user device" Must="cn Name" May="DisplayName GlobalUID Manufacturer Model
CreateDate LastModifiedDate">   322A-M         322A-Y
        <Attribute Name="DisplayName" Description = "the display name"
ObjectIdentifier="2.16.840.1.113894.9999.2"/>
        <Attribute Name="GlobalUID"          335D              335F
ObjectIdentifier="2.16.840.1.113894.9999.3"/>     339
        <Attribute Name="Name" ObjectIdentifier="2.16.840.1.113894.9999.4"/>
        <Attribute Name="Manufacturer"
ObjectIdentifier="2.16.840.1.113894.9999.5"/>
        <Attribute Name="Model" ObjectIdentifier="2.16.840.1.113894.9999.6"/>
        <Attribute Name="CreatedDate"               322A-CD
ObjectIdentifier="2.16.840.1.113894.9999.7"/>
        <Attribute Name="LastModifiedDate"          322A-LMD
ObjectIdentifier="2.16.840.1.113894.9999.8"/>                          322A
    </ObjectClass>

<ObjectClass Name="DeviceAddress" Must="cn"
ObjectIdentifier="2.16.840.1.113894.9999.9" Type="structural" May="Address
NormalizedAddress Carrier GlobalUID Encoding DeviceID Valid CreatedDate
LastModifiedDate">
        <Attribute Name="Address"              322I-M        322I-T
ObjectIdentifier="2.16.840.1.113894.9999.10"/>
        <Attribute Name="NormalizedAddress"                  382A
ObjectIdentifier="2.16.840.1.113894.9999.11"/>
        <Attribute Name="Carrier"
ObjectIdentifier="2.16.840.1.113894.9999.12"/>
        <Attribute Name="GlobalUID"
ObjectIdentifier="2.16.840.1.113894.9999.13"/>
        <Attribute Name="Encoding"
ObjectIdentifier="2.16.840.1.113894.9999.14"/>
        <Attribute Name="DeviceID"
ObjectIdentifier="2.16.840.1.113894.9999.15"/>
        <Attribute Name="Valid" ObjectIdentifier="2.16.840.1.113894.9999.16"/>
        <Attribute Name="CreatedDate"              322I-CD
ObjectIdentifier="2.16.840.1.113894.9999.7"/>
        <Attribute Name="LastModifiedDate"         322I-LMD    322I
ObjectIdentifier="2.16.840.1.113894.9999.8"/>
    </ObjectClass>

<ObjectClass Name="ContactRule" Must="cn"
ObjectIdentifier="2.16.840.1.113894.9999.19" May="Name GlobalUID
DeliveryPeriod DeliveryAction CreatedDate LastModifiedDate">
        <Attribute Name="Name" ObjectIdentifier="2.16.840.1.113894.9999.20"/>
        <Attribute Name="GlobalUID"
ObjectIdentifier="2.16.840.1.113894.9999.21"/>
        <Attribute Name="DeliveryPeriod"
ObjectIdentifier="2.16.840.1.113894.9999.22"/>
        <Attribute Name="DeliveryAction"
ObjectIdentifier="2.16.840.1.113894.9999.23"/>  322N-CD
        <Attribute Name="CreatedDate"
ObjectIdentifier="2.16.840.1.113894.9999.7"/>
        <Attribute Name="LastModifiedDate"         322N-LMD
ObjectIdentifier="2.16.840.1.113894.9999.8"/>                  322N
    </ObjectClass>
</ObjectClasses>
```

FIG. 3C

322AJ org.w3c.dom.Element: name = "ObjectClasses"

org.w3c.dom.Element: name = "ObjectClass"
org.w3c.dom.Attr: name = "Name"; value = "UserDevice"
org.w3c.dom.Attr: name = "ObjectIdentifier"; value = "2.16.840.1.113894.9999.1"
org.w3c.dom.Element: name = "Attribute"
org.w3c.dom.Attr: name = "Name"; value = "DisplayName"
org.w3c.dom.Attr: name = "ObjectIdentifier"; value = "2.16.840.1.113894.9999.2"
org.w3c.dom.Element: name = "Attribute"
org.w3c.dom.Attr: name = "Name"; value = "GlobalUID"
org.w3c.dom.Attr: name = "ObjectIdentifier"; value = "2.16.840.1.113894.9999.3"
org.w3c.dom.Element: name = "Attribute"
org.w3c.dom.Attr: name = "Name"; value = "Name"
org.w3c.dom.Attr: name = "ObjectIdentifier"; value = "2.16.840.1.113894.9999.4"
org.w3c.dom.Element: name = "Attribute"
org.w3c.dom.Attr: name = "Name"; value = "Manufacturer"
org.w3c.dom.Attr: name = "ObjectIdentifier"; value = "2.16.840.1.113894.9999.5"
org.w3c.dom.Element: name = "Attribute"
org.w3c.dom.Attr: name = "Name"; value = "Model"
org.w3c.dom.Attr: name = "ObjectIdentifier"; value = "2.16.840.1.113894.9999.6"
org.w3c.dom.Element: name = "Attribute"
org.w3c.dom.Attr: name = "Name"; value = "CreatedDate"
org.w3c.dom.Attr: name = "ObjectIdentifier"; value = "2.16.840.1.113894.9999.7"
org.w3c.dom.Element: name = "Attribute"
org.w3c.dom.Attr: name = "Name"; value = "LastModifiedDate"
org.w3c.dom.Attr: name = "ObjectIdentifier"; value = "2.16.840.1.113894.9999.8"

...

382AJ org.w3c.dom.Element: name = "Attribute"
org.w3c.dom.Attr: name = "Name"; value = "Carrier"
org.w3c.dom.Attr: name = "ObjectIdentifier"; value = "2.16.840.1.113894.9999.12"

FIG. 3D

ObjectClasses — 322AK
java.util.List<ObjectClass> = {
ObjectClass
Name = UserDevice
ObjectIdentifier = 2.16.840.1.113894.9999.1
java.util.List<Attribute> = {
Attribute
Name = DisplayName
ObjectIdentifier = 2.16.840.1.113894.9999.2
Attribute
Name = GlobalUID
ObjectIdentifier = 2.16.840.1.113894.9999.3
Attribute
Name = Name
ObjectIdentifier = 2.16.840.1.113894.9999.4
Attribute
Name = Manufacturer
ObjectIdentifier = 2.16.840.1.113894.9999.5
Attribute
Name = Model
ObjectIdentifier = 2.16.840.1.113894.9999.6
Attribute
Name = CreatedDate
ObjectIdentifier = 2.16.840.1.113894.9999.7
Attribute
Name = LastModifiedDate
ObjectIdentifier = 2.16.840.1.113894.9999.8
}

ObjectClass
Name = DeviceAddress
ObjectIdentifier = 2.16.840.1.113894.9999.9 — 382AK
java.util.List<Attribute> = {
Attribute
Name = Carrier
ObjectIdentifier = 2.16.840.1.113894.9999.12
}
}

FIG. 3E

```
dn: cn=schema
changetype: modify
add: attributetypes
attributetypes: ( 2.16.840.1.113894.9999.2 NAME "DisplayName" DESC "the
display name" EQUALITY caseIgnoreMatch SYNTAX "1.13.2.4.5.6.4.5.6.6"
SINGLE-VALUED )
attributetypes: ( 2.16.840.1.113894.9999.3 NAME "GlobalUID" EQUALITY
      caseIgnoreMatch SYNTAX "1.13.2.4.5.6.4.5.6.6{256}" SINGLE-VALUED
)
attributetypes: ( 2.16.840.1.113894.9999.4 NAME "Name" EQUALITY
caseIgnoreMatch   SYNTAX "1.13.2.4.5.6.4.5.6.6{64}" SINGLE-VALUED )
attributetypes: ( 2.16.840.1.113894.9999.5 NAME "Manufacturer" EQUALITY
      caseIgnoreMatch SYNTAX "1.13.2.4.5.6.4.5.6.6" SINGLE-VALUED )
attributetypes: ( 2.16.840.1.113894.9999.6 NAME "Model" EQUALITY
caseIgnoreMatch   SYNTAX "1.13.2.4.5.6.4.5.6.6" SINGLE-VALUED )
attributetypes: ( 2.16.840.1.113894.9999.7 NAME "CreatedDate" EQUALITY
      caseIgnoreMatch SYNTAX "1.13.2.4.5.6.4.5.6.6" SINGLE-VALUED )
attributetypes: ( 2.16.840.1.113894.9999.8 NAME "LastModifiedDate"
EQUALITY   caseIgnoreMatch SYNTAX "1.13.2.4.5.6.4.5.6.6" SINGLE-VALUED
)
attributetypes: ( 2.16.840.1.113894.9999.9 NAME "Address" EQUALITY
      caseIgnoreMatch SYNTAX "1.13.2.4.5.6.4.5.6.6" SINGLE-VALUED )
attributetypes: ( 2.16.840.1.113894.9999.10 NAME "NormalizedAddress"
EQUALITY   caseIgnoreMatch SYNTAX "1.13.2.4.5.6.4.5.6.6" SINGLE-VALUED
)
attributetypes: ( 2.16.840.1.113894.9999.11 NAME "Carrier" EQUALITY
      caseIgnoreMatch SYNTAX "1.13.2.4.5.6.4.5.6.6" SINGLE-VALUED )
attributetypes: ( 2.16.840.1.113894.9999.12 NAME "GlobalUID" EQUALITY
      caseIgnoreMatch SYNTAX "1.13.2.4.5.6.4.5.6.6" SINGLE-VALUED )
attributetypes: ( 2.16.840.1.113894.9999.13 NAME "Encoding" EQUALITY
      caseIgnoreMatch SYNTAX "1.13.2.4.5.6.4.5.6.6" SINGLE-VALUED )
attributetypes: ( 2.16.840.1.113894.9999.14 NAME "DeviceID" EQUALITY
      caseIgnoreMatch SYNTAX "1.13.2.4.5.6.4.5.6.6" SINGLE-VALUED )
attributetypes: ( 2.16.840.1.113894.9999.15 NAME "Valid" EQUALITY
      caseIgnoreMatch SYNTAX "1.13.2.4.5.6.4.5.6.6" SINGLE-VALUED )
attributetypes: ( 2.16.840.1.113894.9999.16 NAME "DeliveryPeriod"
EQUALITY   caseIgnoreMatch SYNTAX "1.13.2.4.5.6.4.5.6.6" SINGLE-VALUED
)
attributetypes: ( 2.16.840.1.113894.9999.17 NAME "DeliveryAction"
EQUALITY   caseIgnoreMatch SYNTAX "1.13.2.4.5.6.4.5.6.6" SINGLE-VALUED
)
      361         362 dn: cn=schema
changetype: modify
add: objectclasses
objectclasses: ( 2.16.840.1.113894.9999.1 NAME "UserDevice" SUP 'top'
AUXILIARY Description 'description of user device' MUST ( cn $ Name )
MAY
( DisplayName $ GlobalUID $ Manufacturer $ Model $ CreatedDate $
LastModifiedDate ) )
objectclasses: ( 2.16.840.1.113894.9999.1 NAME "DeviceAddress" SUP
'top' STRUCTURAL MUST cn    MAY ( Address $ NormalizedAddress $
Carrier $ GlobalUID$ Encoding $    DeviceID $ Valid $ CreatedDate $
LastModifiedDate ) )
objectclasses: ( 2.16.840.1.113894.9999.1 NAME "ContactRule" SUP 'top'
MUST cn    MAY ( Name $ GlobalUID $ DeliveryPeriod $ DeliveryAction $
CreatedDate $    LastModifiedDate ) )
```

FIG. 3F

| XML Attr Name | LDAP Attr Name | Comments |
|---|---|---|
| Name | NAME | |
| ObjectIdentifier | * | Name ignored conversion. Value copied over |
| Description | * | Name and Value ignored in conversion |
| Syntax | SYNTAX | Name and Value carried over in conversion |
| Single-value | SINGLE-VALUED | If value in XML is true, attribute name carried over. Ignored otherwise |
| Comparison | EQUALITY | Name and Value carried over in conversion |
| Usage-type | * | Name and value ignored in conversion |

FIG. 3G

| XML Node Name | LDIF Conversion Template |
|---|---|
| Attribute | attributetypes: ( %ObjectIdentifier% NAME %Name% EQUALITY %Comparison% SYNTAX %Syntax% %Single-value% ) |
| ObjectClass | objectclasses: (%ObjectIdentifier% NAME %Name% SUP %Superior% %Type% Description %Description% MUST ( %RequiredAttributes% ) MAY ( %OptionalAttributes% ) ) |

FIG. 3H

```xml
/-311
<?xml version="1.0" encoding="windows-1252" ?>
<xsd:schema xmlns:xsd="http://www.w3.org/2001/XMLSchema"
        xmlns="http://www.oracle.com/xmlns/idm/extensions"
        targetNamespace="http://www.oracle.com/xmlns/idm/extensions"
        elementFormDefault="qualified">
  <xsd:element name="ObjectClasses">
    <xsd:annotation>
      <xsd:documentation>ObjectClass</xsd:documentation>
    </xsd:annotation>
    <xsd:complexType>
      <xsd:sequence>
        <xsd:element name="ObjectClass" type="objectClassType" minOccurs="0"
                maxOccurs="unbounded"/>
      </xsd:sequence>
    </xsd:complexType>
  </xsd:element>
  <xsd:complexType name="objectClassType">
    <xsd:sequence>
      <xsd:element name="Attribute" type="attributeType" minOccurs="1"
              maxOccurs="unbounded"/>
    </xsd:sequence>
    <xsd:attribute name="Name" use="required" type="xsd:string"/>
    <xsd:attribute name="ObjectIdentifier" type="xsd:string" use="optional"
            default="2.16.840.1.113894.9999"/>
    <xsd:attribute name="Superior" type="xsd:string" default="top"
            use="optional"/>
    <xsd:attribute name="Description" type="xsd:string" use="optional"/>
    <xsd:attribute name="Must" type="xsd:string" use="required"/>
    <xsd:attribute name="May" type="xsd:string" use="optional"/>
    <xsd:attribute name="Type" default="auxiliary" type="typeAttrType"
            use="optional"/>
  </xsd:complexType>
  <xsd:complexType name="attributeType">
    <xsd:attribute name="Name" use="required" type="xsd:string"/>
    <xsd:attribute name="ObjectIdentifier" type="xsd:string" use="optional"
            default="2.16.840.1.113894.9999"/>
    <xsd:attribute name="Superior" default="name" use="optional"
            type="xsd:string"/>
    <xsd:attribute name="Description" type="xds:string" use="optional"/>
    <xsd:attribute name="Syntax" default="1.13.2.4.5.6.4.5.6.6" use="optional"
            type="xsd:string"/>
    <xsd:attribute name="Single-value" ref="xsd:Boolean" default="false"
            use="optional"/>
    <xsd:attribute name="Length" default="4000" type="int"/>
    <xsd:attribute name="Comparison" default="caseIgnoreMatch" use="optional"
            type="xsd:string"/>
    <xsd:attribute name="Usage-type" default="userApplications" use="optional"
            type="xsd:string"/>
  </xsd:complexType>
  <xsd:simpleType name="typeAttrType">
    <xsd:restriction base="xsd:string">
      <xsd:enumeration value="abstract"/>
      <xsd:enumeration value="structural"/>
      <xsd:enumeration value="auxiliary"/>
    </xsd:restriction>
  </xsd:simpleType>
</xsd:schema>
```

FIG. 4D

```
public class UserDevice {
private LDAPpeer, ldapPeer;
...
public String getModel ()
        return ldapPeer.getProperty("model");
}
public void setModel(String value) {
        ldapPeer.setProperty("model", value);
}
...
}
```

FIG. 4E

```
public class UserDevice {
public List<Device Address> getDeviceAddresses() {
        return ...
}
public void addDeviceAddress (DeviceAddress da) {
...
}
public void removeDeviceAddress (DeviceAddress da) {
...
}
...
}
```

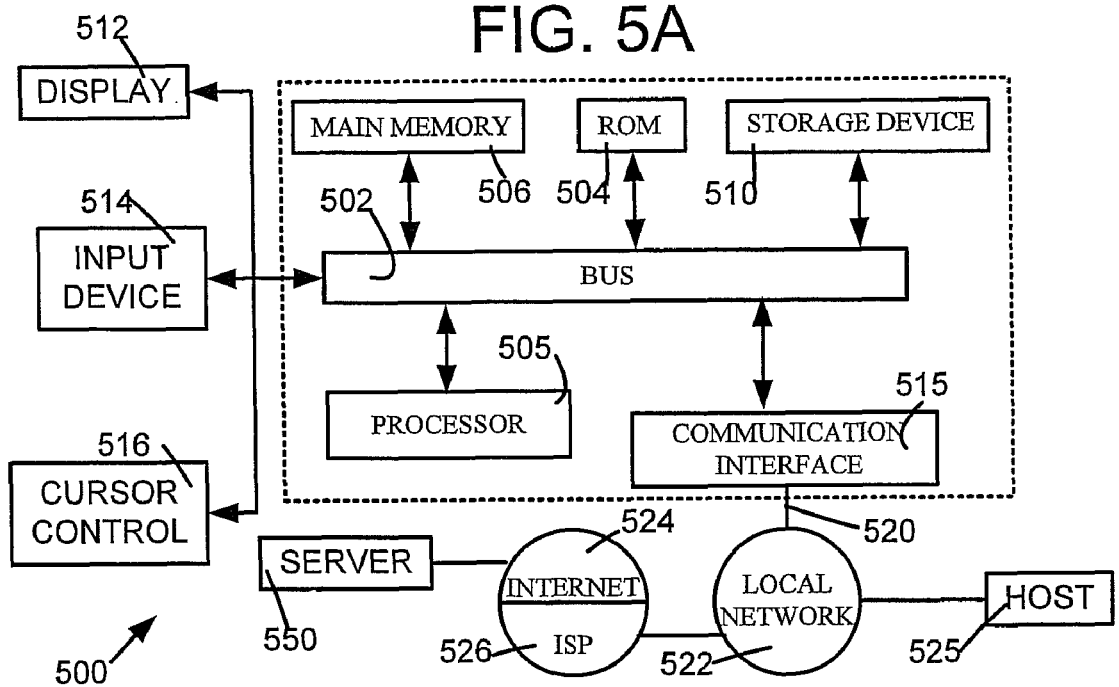
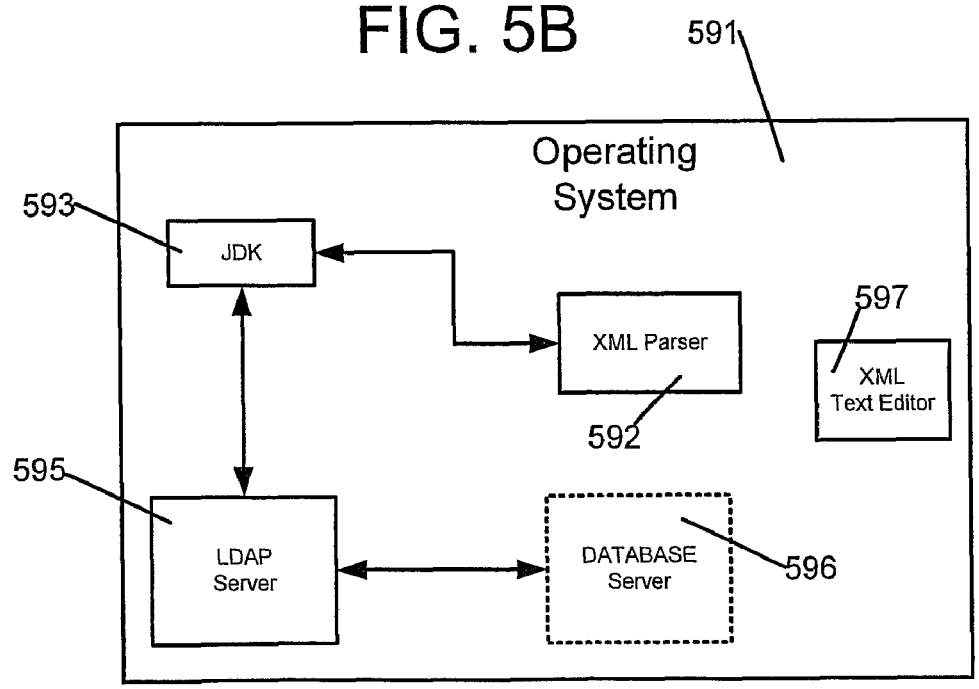

LIGHTWEIGHT DIRECTORY ACCESS PROTOCOL (LDAP) SCHEMA DEFINITION USING EXTENSIBLE MARKUP LANGUAGE (XML)

BACKGROUND

Lightweight Directory Access Protocol (LDAP) is a well known standard defined by Internet Engineering Task Force (IETF) to enable server computers to provide directory services to client computers. The client computers may contain various application programs such as an email tool which makes a TCP/IP connection to an LDAP server computer, to look up entries maintained in a directory by the LDAP server. Each entry in such a directory contains information (such as a URL) about an object (such as a file). Each entry in the directory has several attributes, and each attribute has a particular syntax which identifies the types of values that can be associated therewith. Syntax definition for attributes in the Lightweight Directory Access Protocol may conform to a standards document called RFC 2252 which is available at the following website (wherein "%" should be replaced by "/" and "-" replaced by "."):

http:%%www-ietf-org%rfc%rfc2252-txt.

Note that this format for URLs is followed throughout this patent application. Some attribute types are defined by the International Telecommunication Union (ITU-T) in # ITU-T Recommendation X.520-Information Technology-Open Systems Interconnection-The Directory: Selected attribute types. In order to create an LDAP directory, it is common for a human to design objects and attributes, which form a schema. See, for example, an article entitled "LDAP Schema Design" by Andrew Findlay, February 2005. Such an LDAP schema can be expressed in human-readable form, in a format called LDAP Data Interchange Format (LDIF) as described in a standards document called RFC 2849 which is available at the following website (wherein "%" should be replaced by "/" and "-" replaced by "."):

http:%%www-ietf-org%rfc%rfc2849-txt

LDIF is typically used to import and export information to/from an LDAP directory. The LDIF format can also be used to describe a set of changes which are to be applied to an LDAP directory. LDIF can further be used for bulk loading of data. For additional information on using LDIF see a document available at the following website (wherein "%" should be replaced by "/" and "-" replaced by "."):

http:%%www-zytrax-com%books%ldap%ch8

Although the LDIF format is human readable, it has a very specific syntax and grammar which cannot be directly parsed by tools that handle Extensible Markup Language (XML) documents, such as a browser. For example, LDIF uses special characters such as a hash sign "#", a comma ",", a plus sign "+", a backslash "\" and a semicolon ";" to have a specific meaning when used an LDIF document. In order to use XML tools, the information in an LDIF document can be expressed in a variant of XML defined by The Organization for the Advancement of Structured Information Standards (OASIS), which is called Directory Service Markup Language (DSML). Currently, DSML has two specifications: a first specification DSMLv1 that can be used to represent the state of a directory, and a second specification DSMLv2 that can be used to represent operations an LDAP directory can perform and the results of such operations. More information on DSML can be found at the following website for OASIS (wherein "%" should be replaced by "/" and "-" replaced by "."):

http:%%www-oasis&open-org%specs%index-php#dsmlv2

Note that in the above URL, the "&" should be replaced by "-". The approach of DSML, as defined in this OASIS standard, is not to abstract the capabilities of LDAP directories, but instead to faithfully represent LDAP directories in XML.

Hence, even though DSML is a form of XML, it appears to so closely follow LDAP that it is necessary for humans writing this variant of XML to have some knowledge of LDAP. Specifically, even if a human is creating a schema for a directory using an XML editing tool (and this human is hereinafter XML developer) they still need to know some aspects of LDAP. For example, the XML developer must know that LDAP names are fully qualified, i.e. start from the root rather than relative names. As another example, the XML developer must supply an identifier for each attribute, and ensure that the identifier remains globally unique over the lifetime of the product. As yet another example, the XML developer must identify a type for each attribute to be one of structural, abstract and auxiliary as per the LDAP. Inventors of the invention described below believe that requiring the XML developer to know LDAP makes it difficult to use an LDAP server for most applications because most XML developers are not familiar with LDAP.

SUMMARY

In accordance with the invention, a computer receives as input, a schema that lacks information required by a predetermined protocol for interfacing with a directory, automatically generates information that conforms to the directory access protocol based on the input schema, and supplies as output a new schema that includes the generated information. The predetermined protocol is hereinafter referred to as a "directory access protocol" and an example of such a protocol is the LDAP standard.

Depending on the embodiment of the invention, automatic generation of information can be implemented by programming the computer to perform two or more of the following acts: copy information from the input schema into the output schema if present in a form compatible with the directory access protocol, translate the information if present in an incompatible form, create any information that is missing but is required by the directory access protocol, and disregard information present in the input schema that is not required by the directory access protocol.

The schemas being input to and output by a computer of the type described above can be expressed in any form, depending on the embodiment, e.g. binary form and/or text form. In illustrative embodiments, the input schema and the output schema are both expressed in a text form. Moreover, the input and output schema(s) can be expressed in any predetermined language(s). In some embodiments, the input schema is expressed in XML, while the output schema is expressed in one of (LDIF and DSML). In some embodiments, the input schema is expressed in XML, while the output schema is expressed in either LDIF or DSML formats.

BRIEF DESCRIPTION OF THE FIGURES

FIG. 3B illustrates an XML file 112 that is generated by XML tool 114 in conformance with the schema in XSD file 119 in accordance with the invention.

FIG. 3C illustrates an in-memory object in the form of an XML DOM tree created by XML parser 141 in conformance with the W3C DOM standard by application of rules in XSD file 119 in accordance with the invention.

FIG. 3D illustrates another in-memory object that is prepared in accordance with the invention based on the object of FIG. 3C by eliminating duplicates and resolving dependencies.

FIG. 3E illustrates an LDAP schema 113 that is expressed in LDIF format by process 111 in accordance with the invention.

FIG. 3F illustrates a table that is used in some embodiments to map XML attribute names to the corresponding LDAP attribute names.

FIG. 3G illustrates templates that are used in some embodiments to generate LDIF file 113.

FIG. 3H illustrates an XSD file 119 that contains rules and syntax for an XML file 112 in accordance with the invention.

FIGS. 4D-4E illustrate Java classes (for single valued attribute and multi-valued attribute respectively) for use by an LDAP client to interface with an LDAP server, in some embodiments of the invention.

FIGS. 5A and 5B illustrate, in block diagrams, hardware and software portions of computers 110, 120 and 130 shown in FIG. 1A. Note that FIG. 5A also illustrates hardware in client devices 131 and 132 shown in FIG. 4A.

DETAILED DESCRIPTION

A computer is programmed in several embodiments of the invention to execute a process to transform an input schema prepared without knowledge of a predetermined directory access protocol into an output schema that conforms to the directory access protocol. Hence the computer allows a human who prepares the input schema, to enable usage of the directory access protocol (e.g. LDAP) to interface with a directory implemented using the input schema, even if the human is personally ignorant of the directory access protocol (e.g. LDAP). Hence, use of the computer eliminates a prior art need for the human to learn the directory access protocol, in order to use the directory access protocol. Therefore, lack of personal knowledge of the directory access protocol is no longer a deterrent to its use. Instead, the human simply prepares their input schema using any tool (such as a visual editor) that parses the predetermined language of the input schema (e.g. XML), and thereafter uses the programmed computer to supply output compliant with the directory access protocol.

Figure 1A:
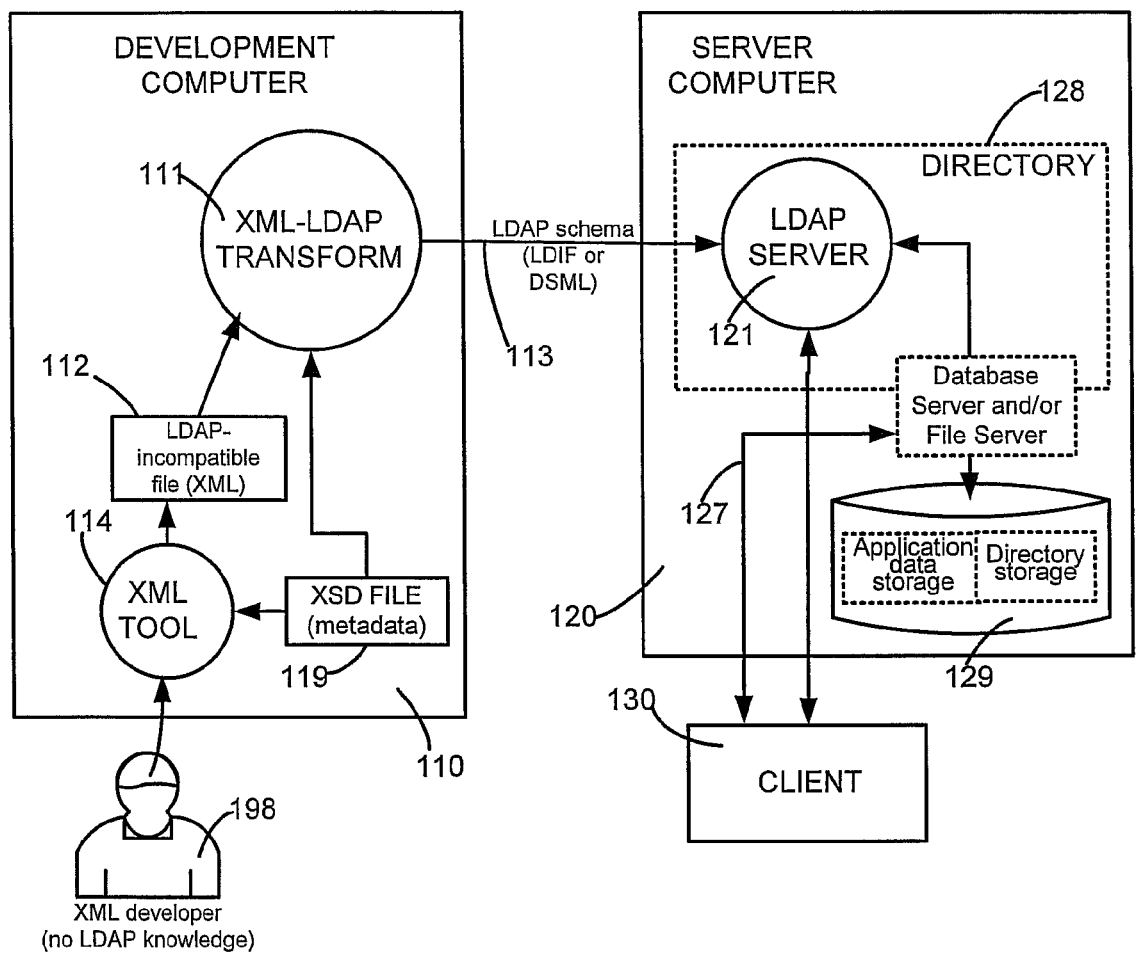
FIG. 1A illustrates, in a high-level block diagram, a directory configuration and use system in accordance with the invention comprising an LDAP schema generator process 111 that automatically generates an LDAP schema 113 from an LDAP-incompatible XML file 112.

In an illustrative embodiment shown in FIG. 1A, a computer 110 receives as input a file 112 which has been prepared by an XML developer 198 using an XML tool 114. Note that XML developer 198 has no LDAP knowledge. Hence, file 112 lacks at least some LDAP-required information, such as fully-qualified names and globally-unique object identifiers. Note that file 112 is expressed in XML, which is a human-readable markup language based on tags. Specifically, in the illustrative embodiment of FIG. 1A, file 112 is prepared by XML developer 198 by editing and extending a predetermined XML file 119. Specifically, in the illustrative embodiment of FIG. 1A, file 112 is prepared by XML developer 198 following the XML structure defined in the XML schema 119.

XML tool 114 allows XML developer 198 to prepare an XML file 112 illustrated in FIG. 3B in conformance with a number of predetermined constraints which are defined in an XML schema, such as XSD file 119 illustrated in FIG. 3H. The XML schema may be defined in some embodiments in conformance with the W3C standard available at the following website (wherein "%" should be replaced by "/" and replaced by "."):

http:%%www-w3-org%XML%Schema.

Referring to FIG. 3H, XSD file 119 describes the structure, content and semantics of an XML files (such as file 112 to be created by tool 114) as follows. XSD file 119 refers to a standard name space 310A which identifies (with the prefix "xsd") a URL for definitions of various data types, such as element, complexType, annotation, etc. XSD file 119 also refers to a custom name space 310B which identifies (as a default name space) another URL for definitions of additional data types, such as ObjectClasses, ObjectClass, etc. XSD file 119 also defines a target name space 310C which identifies the URL for XML documents that are output by the XML tool 114 (such as XML file 112). Note that the URL of the target name space 310C is included in the XML files output by tool 114, as their default name space.

XML-LDAP transform tool 111 uses this default name space in interpreting the XML file 112. XML-LDAP transform tool 111 also needs the schema (i.e. XSD file 119) to interpret XML file 112, and finds this schema in one of several ways as follows. The first way is that XML-LDAP transform tool 111 may already have the XSD file 119 and finds it by matching the default name space URL of the XML file 112 with the target name space URL of the XSD file 119. A second way is that the XML file 112 may provide an optional schema location attribute (which is a URL in this case) and XML-LDAP transform tool 111 downloads the schema from this URL. A third way is that XML developer 198 may supply the XSD file 119 together with the XML file 112 and specify the name of the XSD file again in the schema location attribute (which is a URL followed by a file name).

XML schema element 311 (FIG. 3H) defines the XML ObjectClass which is to be created by XML tool 114 in the XML file 112. The structure of XML schema element 311 illustrated in FIG. 3H conforms to the W3C standard available at the following website (wherein "%" should be replaced by "/" and "-" replaced by "."):

http:%%www-w3-org%2001% XMLSchema

However, the values in element 311 are specified differently in different embodiments, as described below for an illustrative embodiment.

XML schema element 311 uses a schema data type 313 (FIG. 3H), which is named, for example, as objectClassType. This schema data type 313 provides a definition of various LDIF-required data of the object class to be provided by the XML developer 198 (via tool 114), such as unique name 313-N which identifies this class itself, a globally unique object identifier 313-O, a "superior" attribute 313-S (to identify who is the parent of the current object class), a human-readable description 313-D, mandatory "must" attribute(s) 313-M which are required for creation of instances of the object class, optional "may" attribute(s) 313-Y, and a "type" attribute 313-T. In the illustration shown in FIG. 3H, the XSD file 119 makes it mandatory on the XML tool 114 to obtain from the XML developer 198, the value of a single attribute, namely unique name 313-N. Note that all other attributes of the XML element ObjectClass are "developer-optional" as they are not required by XML tool 114 (when operating in conformance with XSD file 119 of FIG. 3H). One or more such attributes may be made "developer-mandatory", in a manner similar to the unique name attribute, e.g. by replacing the keyword "optional" with the keyword "required" in the XSD file.

Attribute(s) 313-M are mandatory for the end user, i.e. required to be provided by an end user of the LDAP server 121, via client 130, when creating an instance of this object class in directory 128. Note that directory 128 of some embodiments includes a database server bundled therein and supports storage of the directory information into a persistent store 129. Store 129 may also hold other application data, which may be placed therein by the database server accessed via path 127 by an application in the client 130. Such an application typically works with user profile (which is stored in the directory storage in store 129) and also works with other data which is application specific. For example, an email application in client 130 stores user's email messages in the application data storage in store 129, in addition to the user's profile (user name, phone numbers and email addresses) in the directory storage in store 129. XML developer 198 (via tool 114) may specify one or more "user-mandatory" attributes 313M, e.g. may specify at least attribute 'cn' in one illustrative embodiment. Note that attribute 'cn' is a predetermined attribute which is supported in every LDAP server 121, as per the LDAP standard. In FIG. 3E, the attributes "cn" and "Name" are examples of two mandatory attributes 312A-M required in an XML file in FIG. 3B that has been prepared in conformance with the XSD file in FIG. 3H.

Attribute(s) 313-Y are optional on the user ("user-optional" attributes), i.e. need not be provided by the end user of the LDAP server 121, via client 130, when creating an instance of this object class in directory 128. XML developer 198 (via tool 114) may specify zero or more optional attributes 313Y. In FIG. 3E, the attributes "DisplayName", "GlobalUID", "Manufacturer", "Model", "CreatedDate" and "LastModifiedDate" are examples of optional attributes 312A-Y which may be provided by the end user when creating an entry in directory 128 in conformance with the LDIF file 113 (FIG. 1A). Note that another objectclass 312I may have one or more optional attributes which are different. The attributes "address", "Normalizedaddress", "Carrier", "Encoding", "DeviceID" etc. are examples of other optional attributes 312I-Y that are allowed by the XML file in FIG. 3B that has been prepared in conformance with the XSD file in FIG. 3H.

Schema data type 313 includes an XML schema element 315 which is defined in conformance with an XML schema complex type 316 (FIG. 3H), which is named, for example, as attributeType. This type 316 provides definitions of several LDIF-required data of the attribute type to be provided by the XML developer 198 (via tool 114), such as a name attribute 316-N which identifies this attribute itself (which is developer-mandatory), an object identifier 316-O (developer-optional) which must be unique among all other object classes and attributes, a superior attribute 316-S (developer-optional) which indicates if this attribute is derived from another attribute type, a human-readable description 316-D, syntax attribute 316-X which is an object identifier for an existing syntax (e.g. 1.3.6.1.4.1.1466.115.121.1.15 which is the object ID for the syntax of "Directory String"), single-value attribute 316-V which identifies whether this attribute is single valued or multi valued with the default being multi valued, a comparison attribute 316-C which identifies a matching rule name (e.g. "caseIgnoreMatch" which is the name of the rule which is predefined in the LDAP server 121), and a usage type attribute 316-U which defines usage of the attribute.

The value of usage type attribute 316-U can be one of the following four predefined values: (1) userApplications (2) directoryOperation (3) distributedOperation (4) dSAOperation. userApplications means the attribute values are user modifiable; directoryOperation means the attribute values are not user modifiable but rather maintained by LDAP server 121 automatically; distributedOperation—means the attribute value is shared across multiple LDAP server 121; dsaOperation means the attribute values are useful for a specific LDAP server 121 for it's own use. For more detailed information on syntax attribute 316-X, see section 4.3 entitled "Syntaxes" in RFC 2252 which has been incorporated by reference elsewhere herein.

In XSD file 119 illustrated in FIG. 3H, "type" attribute 313-T is of an enumerated type, with precisely three LDIF values, which are listed in type definition 318. These three enumerated values are specified in the LDAP specification for X.500. Hence, each object class is required to be precisely one of these enumerated three kinds: (1) abstract object class 318A, which is used to derive other object classes, defining attributes of such object classes that are identical; and an entry in the LDAP directory tree must belong to one of the other object classes, (2) structural object class 318S, which is defined in the specification of the LDAP directory 128 schema and used in the definition of the structure of object names, along with an associated DIT content rule, to control the content of an entry and also define the structure of the DIT; (3) auxiliary object class 318X, which may be used in the construction of entries of several types and are used to extend an object created with a specific structural objectclass;

The LDIF-required data in XML file 112 (FIG. 3B) is used by XML-LDAP transform 111 to create in LDIF file 113 (FIG. 3E), with each "objectclasses" entry 312I, which is one of any number of such entries 312A-312N that may be created in this manner. Each entry 312I includes the corresponding LDIF-required data, such as unique name 312I-N of the class, object identifier 312I-O, superior type 312I-S. Note that matching suffixes preceded by a hyphen ("-N", "-O", "-S" etc) are used in the reference numerals to illustrate correspondence of data in the XSD file of FIG. 3H and the LDIF file of FIG. 3E. If a globally unique object identifier 313-O is not provided by the user, then XML-LDAP transform tool 111 generates the identifier.

As noted above, an XML file 112 shown in FIG. 3B is prepared in conformance with the XSD file in FIG. 3H by XML tool 114, based on information obtained from XML developer 198. More specifically, XML file 112 is prepared to contain a number of XML elements 322A ... 322I ... 322N corresponding to the "objectclasses" entries 312A ... 312I ... 312N in the LDIF file 113 (FIG. 3E). Each XML element 322A is prepared by XML tool 114 to contain a number of attributes (such as attribute 322A-N for name of the object class) which correspond to the attributes in the XSD file 119 (such as name attribute 313-N).

XML-LDAP transform tool 111 interprets XML file 112 based on the schema defined in the XSD file 119. In doing so, XML-LDAP transform tool 111 initially validates the XML file 112, using XSD file 119. Then XML-LDAP transform tool 111 composes LDIF file 113 based on developer-specified information from XML file 112 and default information in XSD file 119. In composing file 113, XML-LDAP transform tool 111 uses two kinds of values from file 112, namely values of developer-mandatory attributes and additionally any values of developer-optional attributes. To the extent that any values of developer-optional attributes are not specified in file 112, XML-LDAP transform tool 111 obtains the corresponding default values from XSD file 119. For example, the type attribute 313-T in XSD file 119 is illustrated as being optional in FIG. 3H, and if developer 198 does not provide any value (i.e. no value for "type" attribute is provided in XML element 322A in file 112 in FIG. 3B), the corresponding default value "auxiliary" is generated as attribute 312A-T in LDIF file 113 (FIG. 3E).

In the example shown in FIG. 3B, the developer 198 has chosen to use the same attribute names "CreatedDate" and "LastModfiedDate" in each of the three ObjectClasses 322A-322N and also specified the same object identifiers (i.e. the values 322A-CD, 322I-CD and 322N-CD are the same, and also the values 322A-LMD, 322I-LMD and 322N-LMD are also the same). In such a case, XML-LDAP transform tool 111 generates a single attribute definition in LDIF file 113, for each identical valued attribute. In the just-described example, a single attribute definition 314-CD is provided in file 113 (FIG. 3E) for the "CreatedDate" attribute and another single attribute definition 314-LMD is provided for the "LastModifiedDate" attribute. If the attribute names are the same and the object identifiers are different, or vice versa, then XML-LDAP transform tool 111 generates an error message and stops generation of the LDIF file. If a value for the object identifier is not specified by the developer for an attribute name, then XML-LDAP transform tool 111 automatically assigns an object identifier as follows. If the same attribute name is used previously and has been associated with an object identifier (either by the developer or by tool 111), then that previously used object identifier is also associated with the later occurrence of the attribute name. If the attribute name is not previously used, then XML-LDAP transform tool 111 generates a globally unique object identifier which is then associated with the attribute name.

XML-LDAP transform tool 111 initially starts generation of LDIF file with three statements 331, 332A and 332B (illustrated in FIG. 3E), as specified in the Internet Standard defined in RFC 2849, namely "The LDAP Data Interchange Format (LDIF)-Technical Specification" available from the Internet Society. RFC 2849 is incorporated by reference herein in its entirety. First statement 331 (FIG. 3E) contains the specification of "dn-spec" which identifies a distinguishedName. The value of distinguishedName is a configuration parameter for XML-LDAP transform tool 111 which is supplied on startup of tool 111. Second statement 332A (FIG. 3E) contains a specification of "changerecord" which identifies a constant as the value for the parameter changetype, namely the value "modify" (note that the other values for this parameter are not used by tool 111). Third statement 332B (FIG. 3E) continues the specification in statement 332A, with an instruction to add attribute types. XML-LDAP transform tool 111 of this embodiment uses only the add instruction as shown in FIG. 3E, although other embodiments may use other instructions, such as delete or replace.

XML-LDAP transform tool 111 thereafter generates a number of statements, one for each new attribute to be added to directory 128, as follows. For example, statement 333 includes a number of tokens 333A-333K as follows. Token 333A is the word "attributetypes" which is a constant for all statements for addition of attributes. Token 333A is followed by a colon, followed by a space, and followed by open parenthesis and followed by a space. This format is in conformance with section 4.2 in RFC 2252, which is strictly followed in this embodiment (i.e. the location of colon and spaces and parenthesis is important). Next, token 333B is the globally unique object identifier of the current attribute, which is being defined. As noted above, this identifier is obtained from attribute "ObjectIdentifier" labeled as item 322A-O in the XML file 112 (FIG. 3B) wherein it was defined by the developer 198, or alternatively if the identifier is not explicitly defined in file 112 then the identifier is automatically generated by tool 111. Next, a space is inserted after token 333B, by XML-LDAP transform tool 111.

Next, a number of pairs of tokens are generated, each token pair containing a term and a term-value. The sequence of pairs, relative to one another, can be different depending on the embodiment, although a specific sequence is illustrated in FIG. 3E and described next.

Specifically, in the illustrated embodiment, token 333C is the constant "NAME" (which is a term) as specified in section 4.2 of the Internet Standard RFC 2252. RFC 2252 is entitled "Lightweight Directory Access Protocol (v3): Attribute Syntax Definitions" and this document is also incorporated by reference herein in its entirety. Next, a space is inserted after token 333C, by XML-LDAP transform tool 111. Then token 333D is generated as term-value "DisplayName" surrounded by quotes, which is obtained from by XML-LDAP transform tool 111 as the value of the "Name" attribute 335D, of the corresponding attribute element in XML file 112. Next, a space is inserted after token 333D, by XML-LDAP transform tool 111.

Then a second pair is generated by XML-LDAP transform tool 111 as follows: token 333E (FIG. 3E) is generated as the term "DESC" which is another constant (also a term) as specified in RFC 2252. Next, a space is inserted after token 333E (FIG. 3E), by XML-LDAP transform tool 111. Then token 333F (FIG. 3E) is generated as term-value "the display name" surrounded by quotes which is obtained from by XML-LDAP transform tool 111 as the value 335F (FIG. 3B) of the "Description" attribute 335F of the corresponding attribute element in XML file 112. Next, a space is inserted after token 333D, by XML-LDAP transform tool 111. As noted above, the order of the first pair relative to the second pair can be reversed in different embodiments.

Then a third pair is generated by XML-LDAP transform tool 111 as follows: token 333G (FIG. 3E) is generated as the term "EQUALITY" which is another constant (also a term) as specified in RFC 2252. Next, a space is inserted after token 333G (FIG. 3E), by XML-LDAP transform tool 111. Then token 333H (FIG. 3E) is generated as term-value "caseIgnoreMatch" which is obtained from by XML-LDAP transform tool 111 as the default value 316C (FIG. 3H) of "Comparison" attribute in XSD file 119. Next, a space is inserted after token 333H, by XML-LDAP transform tool 111. As noted above, the order of the third pair relative to the first and second pair can be different, depending on the embodiment.

Then one or more additional pairs are generated by XML-LDAP transform tool 111 in a similar manner, for the term(s) "SYNTAX" and/or "USAGE" and/or "SINGLE-VALUED" as illustrated in FIG. 3E. Implying the data type of attribute values and if an attribute can hold multiple values or not. Note that the just-described pairs are generated while traversing a tree of Attribute elements (constructed from file 112), with each pair being generated only if it was not previously generated. On completion of traversal of the just-described tree, XML-LDAP transform tool 111 completes the generation of attribute types in LDIF file 113 (FIG. 3E). Thereafter, XML-LDAP transform tool 111 generates object types in LDIF file 113 as discussed next.

XML-LDAP transform tool 111 generates three additional statements 336, 337A and 337B in a manner similar to that described above for statements 331, 332A and 332B, as specified in the Internet Standard defined in RFC 2849. Statements 336 and 337A are identical to statements 331 and 332A. Statement 337B is similar to statement 332B, with one difference as follows: "attributetypes" is replaced with "objectclasses". XML-LDAP transform tool 111 then generates a number of tokens in a manner similar to that described above for tokens 333A-333K, with the first token here, namely token 338A being "objectclasses". Token 338A is followed by a colon, followed by a space, and followed by open parenthesis and followed by a space. This format for the objectclasses is in conformance with the attribute syntax definitions in section 4.4 of RFC 2252 which is also strictly followed in this embodiment (i.e. the location of colon and spaces and parenthesis is important).

Next, XML-LDAP transform tool 111 generates token 3120A-O as the globally unique object identifier of the current objectClass, which is being defined. As noted above, this identifier is obtained from attribute "ObjectIdentifier" as the value 339 in the XML file 112 (FIG. 3B) wherein it was defined by the developer 198, or alternatively if the identifier is not explicitly defined in file 112 then the identifier is once again automatically generated by tool 111. Next, a space is inserted after token 312A-O, by XML-LDAP transform tool 111. Thereafter, XML-LDAP transform tool 111 generates a number of pairs of tokens (each token pair containing a term and a term-value) in the above-described manner, but this time for an objectClass. Here as well, the sequence of pairs, relative to one another, can be different depending on the embodiment, although a specific sequence is illustrated in FIG. 3E and described next.

Specifically, in the illustrated embodiment, token 338B is the constant "NAME" (which is a term) as specified in section 4.4 of the Internet Standard RFC 2252. Next, a space is inserted after token 338B, by XML-LDAP transform tool 111. Then token 312A-N is generated as term-value "UserDevice" surrounded by quotes, which is obtained from by XML-LDAP transform tool 111 as the value of the "Name" attribute 322A-N, of the corresponding attribute element in XML file 112. Next, a space is inserted after token 312A-N, by XML-LDAP transform tool 111. Note that several such pairs of tokens are generated for the current objectClass, with the term and term-value in each token pair conforming to section 4.4 of the Internet Standard RFC 2252. After completion of token pair generation for the current objectClass, the just-described acts for the current objectClass are repeated for any number of such objectClasses, depending on the corresponding definitions in the XML file 112 (FIG. 3B).

XML file 112 can be prepared using any traditional XML tools such as visual editors, validators and document generators. Although the illustrative embodiment is described and shown for XML file 112 expressed in the extensible markup language XML, as will be apparent to the skilled artisan, any other language can be used. For example, any markup language in conformance with the Standard Generalized Markup Language (SGML) can be used instead of XML. XML and SGML are industry standards, described at, for example, the website obtained by replacing dashes with dots in the following: www-w3-org. Moreover, depending on the embodiment, XML file 112 can be expressed in any text based language and/or XML file 112 may even exist in binary form in some embodiments.

Note that XML file 112 that is generated by tool 114 is not compatible with LDAP and hence it cannot be directly input into any LDAP server program known to the inventors of this patent application, such as Oracle Internet Directory (OID) available from Oracle Corporation of Redwood Shores, Calif. Note that other commercially-available LDAP servers that can be used in place of server 121 described herein are as follows: OpenLDAP IBM Tivoli Directory Server, Sun Java System Directory Server, Novell eDirectory, and Microsoft Windows Server 2003 Active Directory.

LDAP-incompatible XML file 112 from tool 114 is provided as input to a process 111 in computer 110 for transformation into an LDAP schema. Process 111 (also called XML-LDAP transform process) supplies an LDAP schema 113 as output in a form appropriate for use in the normal manner, e.g. to build a directory 128 that is accessible to an LDAP client 130 via an LDAP server process 121 executing in server computer 120. XML-LDAP transform process 111 is implemented in some embodiments of computer 110 by a processor 505 performing at least three operations 111A-111C illustrated in FIG. 1B. Specifically, in operation 111A computer 110 receives LDAP-incompatible XML file 112 and uses an XML parser 141 illustrated in FIG. 1C to generate an XML tree 151 in memory 506. Referring back to FIG. 1B, in operation 111B computer 110 traverses the XML tree and uses the XML information in each node to generate information for an LDAP node by using one or more of logics 142 and/or data 143 (FIG. 1C).

Figure 1B:
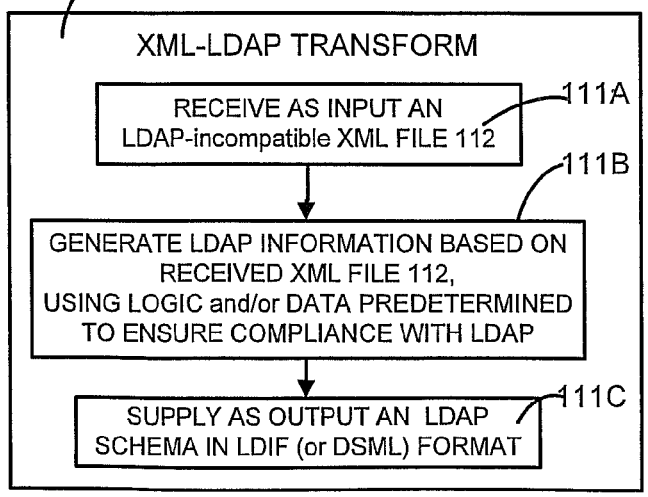
FIG. 1B illustrates, in a high-level flow chart, acts performed by a processor 505 in computer 110 to execute LDAP schema generator process 111 of FIG. 1A.

Typically, logic 142 and/or data 143 are designed to generate LDAP information from XML information that has been prepared using the metadata in XML file 119 (FIG. 1A). For example, certain keywords in such metadata identify a logic 142 and/or a data 143 to be used in generate operation 111B. Referring to FIG. 1B, in operation 111C computer 110 supplies as an output of the XML-LDAP transform process 111, an LDAP schema 113 obtained by serializing LDAP tree 152. The LDAP schema 113 supplied by operation 111C is in the LDIF format (or alternatively in the DSML format, depending on the embodiment).

Figure 1C:
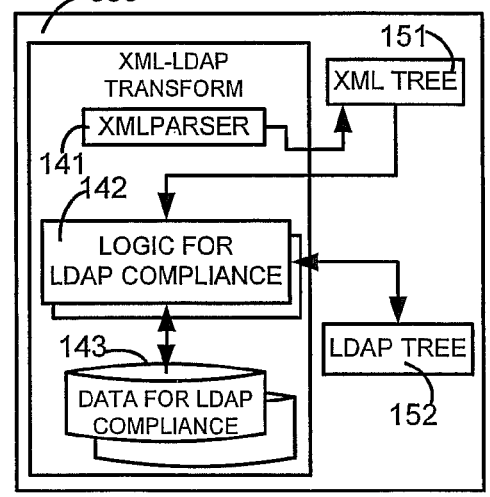
FIG. 1C illustrates, in a high-level block diagram, logic and data in a memory 506 in computer 110 when executing LDAP schema generator process 111 of FIG. 1A.

Although one specific embodiment is shown in FIGS. 1A-1C and has been described above, numerous modifications and adaptations will be apparent to the skilled artisan in view of this disclosure. Hence, although a specific configuration with two computers 110 and 120 is shown in FIG. 1A, other embodiments may use more computers or fewer computers. For example, a first alternative embodiment uses the computers for each executing a respective one of three processes 114, 111 and 121. In a second alternative embodiment, all three processes 111, 121 and 114 execute inside a single computer. In the second alternative embodiment, in one variation thereof processes 111, 121 and 114 are three separate and distinct processes, whereas in another variation the individual operations of processes 111, 121 and 114 are combined and executed in a single process. The just-described single process of the second alternative embodiment interfaces directly with an XML developer 198, in a manner similar to a prior art editor for XML documents and concurrently generates directory 128 and either or both of XML file 112 and LDAP schema 113, depending on the embodiment. The just-described concurrent operation illustrates lack of requirement to perform such operations in a specific sequence, even though illustrative sequences are shown and described for a few embodiments in FIGS. 1B, 1C, 2, 3A, 4B and 4C.

In a third alternative embodiment, two computers are used wherein process 114 executes in one computer and processes 111 and 121 execute in the other computer. In the third alternative embodiment, in one variation thereof LDAP server process 121 and XML-LDAP transform process 111 are two separate and distinct processes whereas in another variation the individual operations of processes 111 and 121 are combined and executed in a single process. The just-described single process of the third alternative embodiment accepts an XML file 112 that is LDAP-incompatible and directly builds directory 128 as specified therein. For example, the just-described single process uses LDAP tree 152 (FIG. 1C) in its binary form, i.e. without writing a file of LDAP schema 113 in text form.

Figure 2:
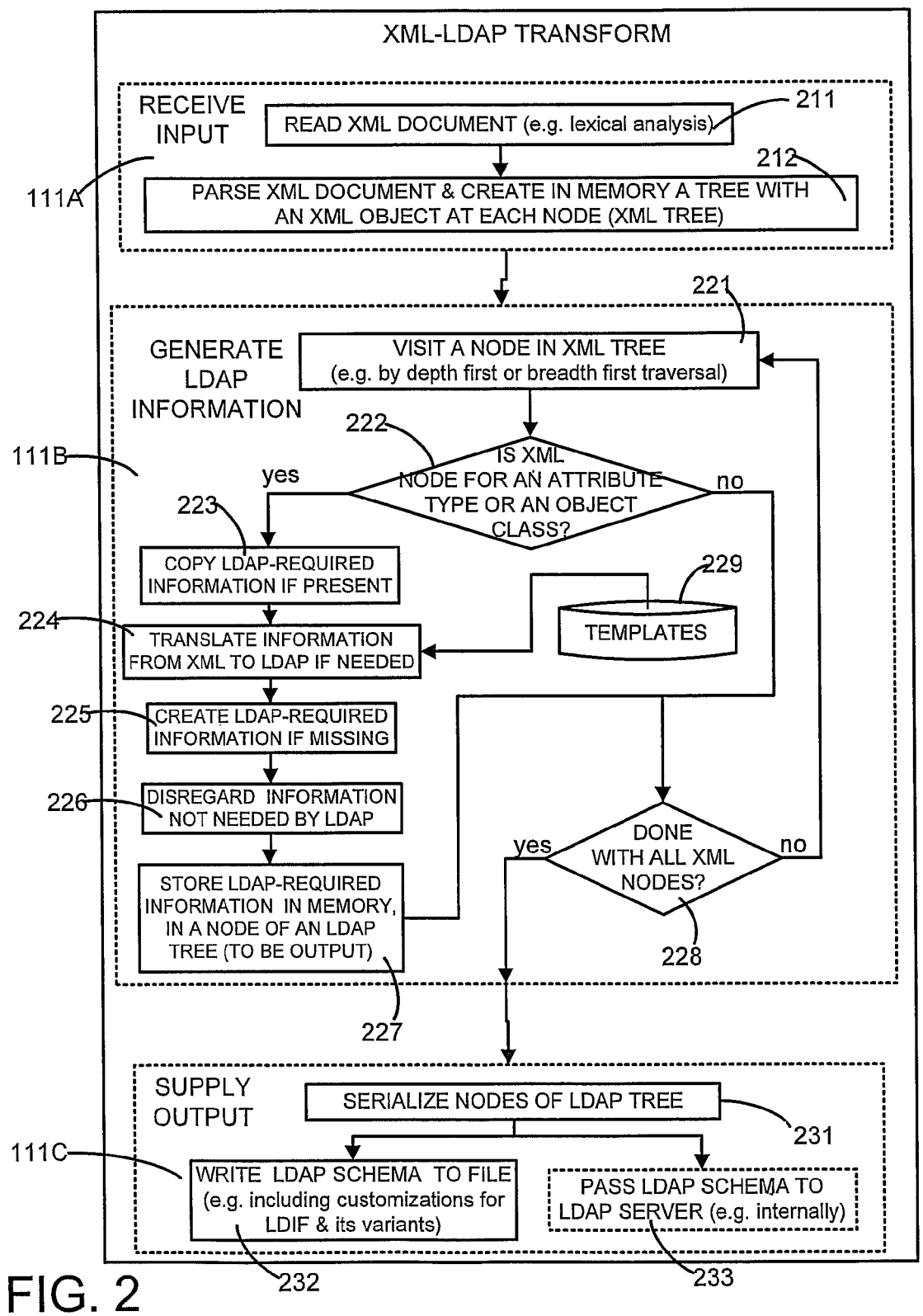
FIG. 2 illustrates, in an intermediate level flow chart, acts that are performed in some embodiments to implement operations 111A-111C shown in FIG. 1B.

In some embodiments, computer 110 is programmed to perform one or more of acts 211, 212, 221-228, 231-233 illustrated in FIG. 2, to implement the respective operations 111A-111C of FIG. 1B. Specifically, in act 211, the computer reads an XML document 112 and performs lexical analysis thereon to identify tokens. Next, in act 112, the computer parses the XML document that has just been read and creates in memory 506 a tree (hereinafter XML tree) 151. The computer stores, at each node of XML tree 151, an XML object that was read in act 211. Therefore, acts 211 and 212 implement operation 111A. Note that in some embodiments, each node of XML tree 151 contains an XML object that was read in act 211 from file 112.

Next, in act 221, computer 110 traverses XML tree 151, i.e. visits each node therein (called XML node), one at a time. The traversal of tree 151 may be performed in any order, although some embodiments use a depth-first method whereas other embodiments use a breadth-first method. Then, in act 223, computer 110 checks if the current XML node (the node being visited) is one of (attribute type and object class) or not. If yes, then the computer proceeds to perform acts 223-227, following which computer 110 goes to act 228. If the answer was no in act 222, the computer also goes to act 228. In act 228, computer 110 checks to see if all XML nodes have been visited in tree 151 and if not then it returns to act 221 and alternatively performs operation 111C (i.e. tree has been completely traversed).

In act 223, computer 110 copies certain LDAP-required information, if such information is present in the current XML node. The information to be copied may be present in the current XML node, depending on metadata in file 119 according to which the current XML node was populated and/or validated. The information to be copied is predetermined in some embodiments, based on typical values that are used by XML developers. As illustrated by the XSD schema 119 (FIG. 1A), an example of which is shown in FIG. 3H, the attribute 351 for "Comparison" is assigned a default value 352 of "caseIgnoreMatch". Note that the XSD statement identifies this attribute as being "optional" by the use tag 353 in the XSD file. Hence, the XML tool 114 does not force the XML developer to specify the value for this attribute 351. If this value is not specified by the XML developer, then the value 352 is used by the XML-LDAP transformer 111 in the conversion process, as illustrated in FIG. 3E. Specifically, the attribute 351 is automatically translated to the LDIF attribute 361 of value "Equality" followed by automatic insertion of the value 362 of "caseIgnoreMatch".

In act 224, the computer 110 translates any information in the current XML node which is required by LDAP but which is present in a different form. Examples of automatic translation in act 224 include (1) lookup of templates store 229 using a data type identifier as an index therein, (2) string concatenation of a relative name with a path to form a fully-qualified name, and (3) syntax conversion to account for differences in grammar and/or special characters. FIG. 3F shows a typical syntax conversion scheme between XML attribute name (in the first column) and the corresponding LDAP attribute name (in the middle column), with comments (in the third column) indicating how the conversion is implemented. In FIG. 3F, the "*" symbol in the middle column indicates that the conversion process ignores this attribute because the attribute is not required to be present in the LDAP tree. For example, the XML attribute "Comparison" is mapped to the LDAP attribute "EQUALITY" as shown by the $5^{th}$ row in the table of FIG. 3F.

Additionally, in act 225, computer 110 creates any information that is missing from the current XML node and which is required by LDAP, such as an object identifier (OID) that is globally unique. Such missing information, which is needed by LDAP, may be obtained from a default value in the XSD file as illustrated in FIG. 3H. In act 226, computer 110 disregards any information in the current XML node that cannot be used by LDAP (such as an upper limit and a lower limit on a value of an attribute).

After acts 223-226 have been performed (in any order relative to one another although one illustrative sequence is shown in FIG. 2), computer 110 performs act 227. Specifically in act 227, the computer stores information generated by these acts 223-226 in a node of an LDAP tree 152. As noted above, after act 227 the computer goes to act 228 (described above). If the answer in act 228 is no, then operation 111B is completed. Next in act 231, computer 110 serializes the LDAP tree 152 resulting from operation 111B. The LDAP schema which results from such serialization can be supplied by computer 110, in any predetermined form depending on the embodiment.

In some embodiments, computer 110 performs act 232 to write this information to a file 113 in a text form. File 113 can be expressed in any predetermined language, including a variant of XML called DSML or a text-based language specific to LDAP called LDIF, depending on the embodiment. File 113 can be transmitted by computer 110 to LDAP server process 121 which executes in another computer 120, e.g. by use of the HTTP protocol. Note that file 113 can be expressed in a variant of LDIF which depends on the vendor and version number of LDAP server process 121 (e.g. customized for Microsoft or IBM LDAP server due to variations therebetween). In an alternative embodiment, computer 110 does not perform act 232 and instead performs act 233 to pass the LDAP schema (in a binary form of tree 152) to an LDAP server that is internal to computer 110.

Figure 3A:
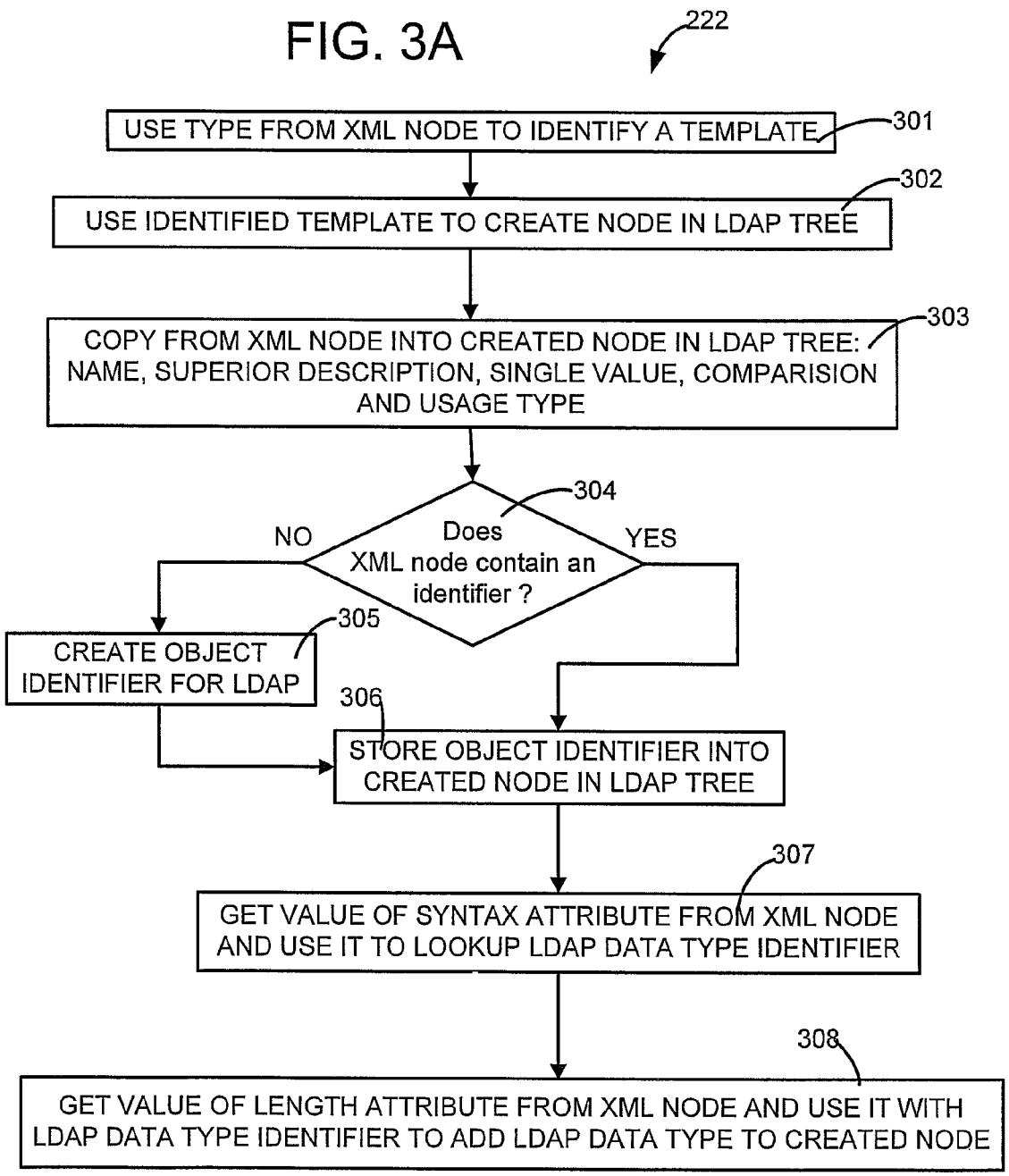
FIG. 3A illustrates, in a low level flow chart, certain acts that are performed in some embodiments, to implement act 222 of FIG. 2 to generate LDAP-required information for an XML object.

A method for implementing acts 223-226 of FIG. 2 in some embodiments, is illustrated in FIG. 3A. Specifically, in act 301, computer 110 uses the type information from the current XML node to identify a template in a library of templates. FIG. 3G illustrates two templates, one for the "Attribute" transformation and another for the "Object Class" transformation. Such transformations are used by XML-LDAP process 505 to create nodes in the LDAP tree 152 from the nodes in the XML tree 151 (see FIG. 1C). In FIG. 3G, the words that are surrounded by (i.e. located between) the % signs are variables whose values are obtained from data in an XML node. Hence, during the creation of the LDAP tree 152, the value for the string % Name % is obtained from the value of the 'Name' attribute in the corresponding XML node of the XML tree 151. For example, the value of string % Name % in the LDAP tree is obtained from the object class called "User-Device" (see name 322A-N in object class 322A in FIG. 3B).

Next, in act 302, computer 110 uses the identified template to create a node in the LDAP tree. Then, in act 303, computer 110 copies the following information from the current XML node into the created node in the LDAP tree, namely: (1) name, (2) superior description, (3) single value, (4) comparison and (5) usage type. During such copying, as noted above, the value in the XML node is transformed if necessary using the table in FIG. 3F in some embodiments. Next, in act 304, computer 110 checks to see if the current XML node contains an object identifier required by LDAP and if so goes to act 306 and otherwise goes to act 305 wherein the identifier is created and thereafter goes to act 306. Note that act 305 may be implemented by some embodiments of the invention to generate a unique LDAP schema identifier which is based at least on current time, for example in accordance with methods described in a specification available at the following website (wherein "%" should be replaced by "/"):

http:%%www.ietf.org%internet-drafts%draft-mealling-uuid-urn-03.txt

In act 306, computer 110 stores the object identifier into the current LDAP node that was created in act 302. Next, in act 307, computer 110 obtains the value of the syntax attribute from the current XML node and uses it to lookup a table (see table 229 in FIG. 2) which yields an LDAP data type identifier. Next, in act 307, computer 110 obtains the value of a length attribute in the current XML node and uses it with the LDAP data type identifier (from table 229), to add an LDAP data type to the current LDAP node. The length is used by LDAP server 121 to enforce safety constraints in the use of LDAP data by client 130 (e.g. to prevent client 130 from causing a buffer overrun by inserting data that is longer than the length) as per RFC 2252.

Figure 4A:
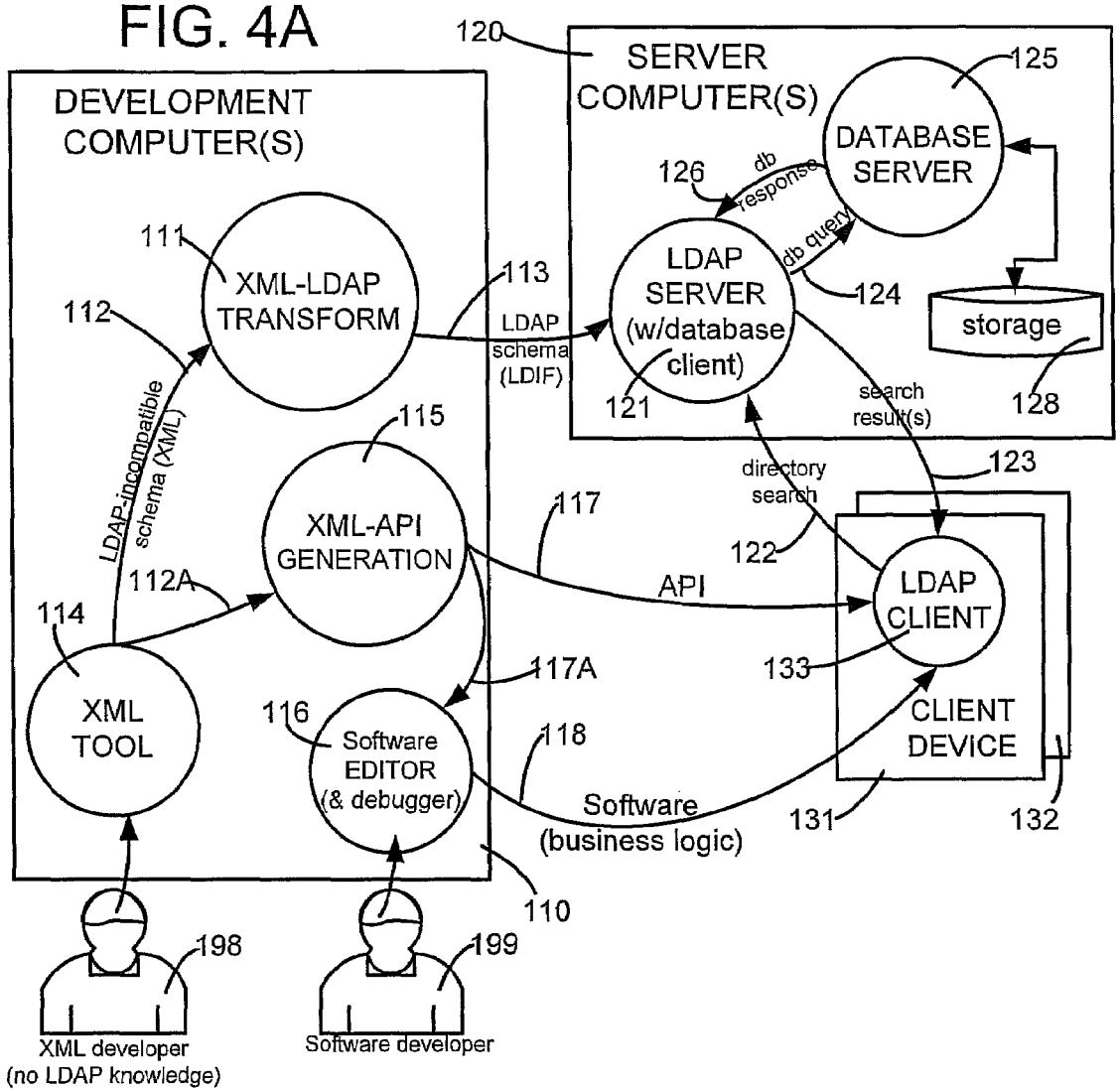
FIGS. 4A-4B illustrate, in drawings that are similar to the corresponding drawings in FIGS. 1A-1B, use of LDAP-incompatible XML file 112 to prepare Java software for an LDAP client in some embodiments of the invention.

Usage of computer 110 which is programmed with XML-LDAP transform process 111 in one illustrative embodiment is now described in reference to FIG. 4A. Note that items shown in FIG. 4A have reference numbers which are identical to reference numbers shown in FIG. 1A for corresponding items which are similar or identical. In this embodiment, a client device 131 executes a process 133 to store data in and retrieve data from directory 128. Note that directory 128 of this embodiment is implemented in a database that is accessed via a database server process 125. For this reason, LDAP server process 121 includes database client software for issuing a database query 124 to a database server process 125 which in turn performs an operation on directory 128 and returns the results of the operation in a database response 126. Such a database query 124 may be generated by the database client in LDAP server process 121 in response to a directory search request 122 from LDAP client 133, and process 121 eventually supplies the data from directory 128 in the search results 123.

Although LDAP server process 121, database server process 125 and directory 128 are shown in FIG. 4A as being implemented in a single server computer 120 in this embodiment, they can be implemented in more computers as will be apparent to the skilled artisan, in view of this disclosure. Furthermore, although the description above refers to a single client device 131, other embodiments can use one or more additional client devices, such as device 132.

In the embodiment illustrated in FIG. 4A, LDAP client process 133 executes software 118 which contains business logic and software 117 that provides an application programming interface (API) to the LDAP server process 121. Business logic software 118 may be implemented in some embodiments in Java bytecodes. Business logic software 118 is produced by a software editor 116 (which may optionally include a debugger) that in turn receives instructions in a high level programming language from a human being 199 (called software developer). Note that in FIG. 4A, software developer 199 and XML developer 198 are shown to be two different persons, although a single person who is knowledgeable about both programming and XML may perform these two roles, as will be apparent to the skilled artisan.

In the embodiment shown in FIG. 4A, API software 117 is automatically produced from the same XML schema that is output by the XML tool 114. Specifically, in this embodiment, a copy 112A of LDAP-incompatible XML file 112 is supplied to a process (called "XML-API generation") 115 which automatically generates API software 117 for interfacing with LDAP server 121. Also in this embodiment, a copy 117A of API software 117 is supplied to software editor 116 which ensures (at the direction of person 199) that the API is appropriately invoked by business logic software 118. Although in the embodiment shown in FIG. 4A, software editor 116 and XML tool 114 are shown as two separate softwares, in other embodiments a single software (not shown) may be used to perform the both functions (i.e. preparation of XML file 112 and preparation of business logic software 118). For example Oracle JDeveloper 10.1.3.3 can be used as an XML editor and software editor.

In the embodiment of FIG. 4A, business logic software 118 and API software 117 are separately compiled (by a compiler in computer 110, which compiler is not shown in FIG. 4A) and the resulting separate files are transferred to client device 131 for use in execution process 133. In this embodiment, client device 131 is a computer (such as a "PC"), and API software 117 is installed as a shared library (e.g. a "DLL" in the operating system called WINDOWS) and software 118 may be installed as an application program (an example of which is an email tool called OUTLOOK). In another embodiment, the two softwares 117 and 118 are compiled and linked together, to form a single executable file which is transferred to client device 131 (an example of which is a cell phone).

Figure 4B:
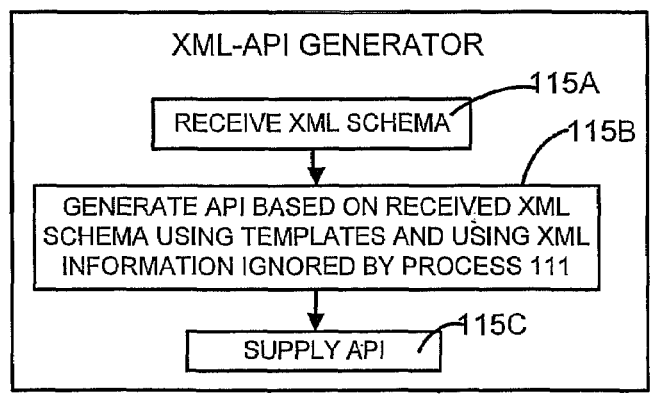

XML-API generation process 115 is implemented in some embodiments of computer 110 by a processor 505 performing at least three operations 115A-115C illustrated in FIG. 4B. Specifically, in operation 115A computer 110 receives XML file 112A and uses an XML parser to generate an XML tree in memory. This operation (to create the XML tree is very similar to the above-described operation 111A of FIG. 1B except that the output is Java source code representing the newly defined objects in the XML-file. The second operation is very similar to that described in Java Specification Request 222 (JSR 222) developed by the Java Community Process and entitled "Java™ Architecture for XML Binding (JAXB) 2.0" which is available on the Internet.

Referring back to FIG. 4B, in operation 115B computer 110 traverses the XML tree and for each node uses a type's value in the node to identify a template of software source code from a library of such templates. The identified template is then customized using, for example, a name's value in the node. Note that in this operation, any information that was disregarded for generating the LDAP information for an LDAP node by operation 111A (FIG. 1B) is used to further customize the identified template. For example, if values for an upper limit and a lower limit are present in the current XML node, these values are used to customize the identified template, to perform range checking (e.g. if the upper limit is 100% and the lower limit is 0% then software in the identified template is customized to check for these limits on a value of the variable being accessed in the directory, which variable may be for example, percentage of CPU utilization).

Operation 115B is designed to generate logic in the API software 117 from XML information that has been prepared using the metadata in XML file 119 (FIG. 1A). For example, certain keywords in such metadata identify the range check to be performed by the API software 117. In an illustrative example, the "Length" XML-attribute, which defines the length constraint of the String attribute value. Referring to FIG. 4B, in operation 115C computer 110 supplies as an output of the XML-API generation process 115, an API software 117 that is obtained by placing in a single file, each of the identified templates after appropriate customization as per operation 115B.

In an illustration of embodiment, business logic software 118 is prepared by editor 116 (FIG. 4A) in the Java programming language and API software 117 (which interfaces to LDAP server 121) is automatically prepared by process 115 (FIG. 4A) in the form of Java classes which conform to the Java Naming and Directory Interface (JNDI) standard extension to Java.

Figure 4C:
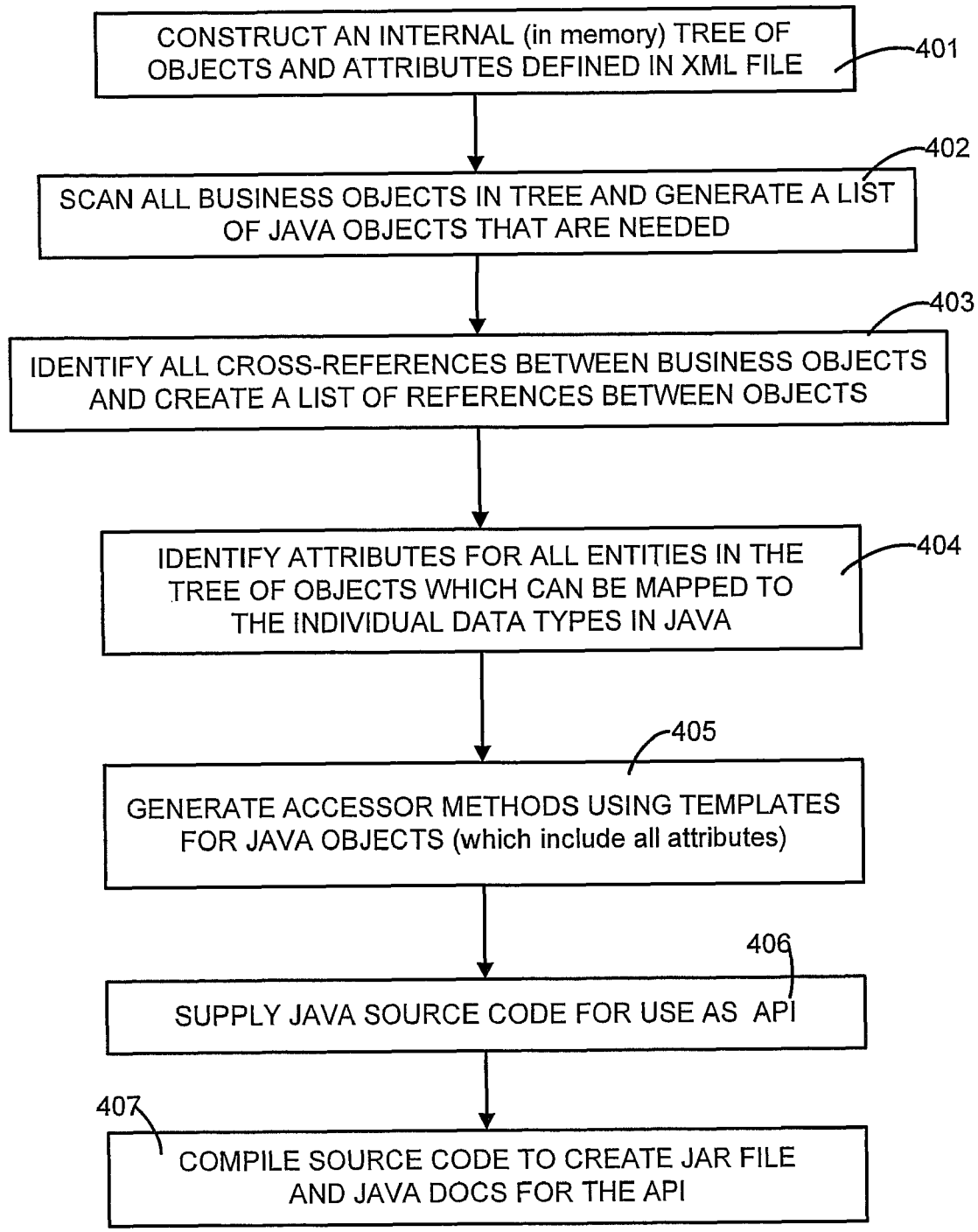
FIG. 4C illustrates, in an intermediate level flow chart, acts that are performed in some embodiments to implement operations 115A-115C shown in FIG. 4B, for example to generate an in-memory data structure of the type shown in FIG. 3D.

A method for implementing XML-API generation process 115 in some embodiments that use Java, is illustrated in FIG. 4C. Specifically, in act 401, an XML parser in computer 110 uses the XML file 112A to construct an internal (in memory) tree (see FIG. 3C) of objects and attributes defined in XML file 112A, also known as a document object model (DOM) tree, which is a first tree that is created in computer 110. Next, in act 402, an XML LDAP transform process 111 in computer 110 scans all business objects in the XML DOM tree, and generates an in-memory tree (which is a second tree that is created in computer 110). This second tree is of Java objects that are needed to prepare the generated Java API. In preparing this second tree, process 111 ignores duplicate XML objects that may be present in the DOM tree (i.e. the first tree). Additionally, process 111 resolves dependencies among objects in the DOM tree, for example if a single attribute is redundantly defined in each of two objects in the DOM tree then the second tree (of Java objects) is prepared with just a single attribute and both objects refer to the single attribute.

Then, in act 403, computer 110 identifies all cross-references between business objects in the list, and creates a list of references to be formed between the java objects (i.e. reference attributes). For example, as shown in FIG. 3B, the "CreatedDate" attribute is used three times, see attributes 322A-CD, 322I-CD and 322N-CD in the respective three objects 322A, 322I and 322N. Hence, in the first tree, i.e. in the XML DOM tree, there are three nodes representing this single attribute three times, once for each object. During the creation of the second tree, comparison of the two values, specifically the Name value and the ObjectIdentifier value of the attributes 322A-CD, 322I-CD and 322N-CD identifies them as being redundant. Hence, when preparing the second tree, i.e. the tree of Java objects, the process 111 inserts just one node for this attribute, and inserts three nodes for the three objects to point to this single node. Note that if process 111 finds during comparison that one of the two values is identical but the other value is different, then process 111 flags an error in the input XML file 112.

Next, in act 404, computer 110 identifies all attributes (e.g. built-in data types supported by the Java Runtime Environment, JRE, as well as any user-defined data types which were defined in XML file 112) for all entities in the second tree of objects, which can be mapped to the individual data types in java. In act 405, computer 110, generates accessor methods, by customizing templates for Java objects, using attributes identified in act 404, and any reference attributes identified in act 403. Reference attributes are any attributes of user-defined data types that reference one or more built-in data types and/or other user-defined data types.

Examples of templates that are used in some embodiments are shown in FIGS. 4D and 4E. Specifically, for object 322A (FIG. 3B), process 111 generates the software source code shown in FIG. 4D from the second tree described above (and illustrated in FIG. 3D). In this example, an instance of the Java type ObjectClass with name "UserDevice" shown at the top of FIG. 3D is used to create the new Java type (class) "UserDevice" in FIG. 4D. Also in this example, as shown in FIG. 3D, the ObjectClass with name "UserDevice" has an attribute with name "Model" and process 111 generates the source code for "getModel and setModel in the Java class "UserDevice." The resulting Java source code is then supplied in act 406, as an output of XML-API generation process 115, for use as an API. The source code is compiled to create Jar file(s) and/or Java docs, in act 407. Note that FIG. 4D illustrates the result of performing the just-described process for built-in data types, whereas the corresponding result for user-defined data types is shown in FIG. 4E. In addition, FIG. 4E shows the source code for a collection of attributes, such as a list in this example.

The method of FIG. 1B is used in some embodiments to program a computer system 500 of the type illustrated in FIG. 5A which is discussed next. Specifically, computer system 500 includes a bus 502 (FIG. 5A) or other communication mechanism for communicating information, and a processor 505 coupled with bus 502 for processing information. Computer system 500 also includes a main memory 506, such as a random access memory (RAM) or other dynamic storage device, coupled to bus 502 for storing information and instructions to be executed by processor 505.

Main memory 506 also may be used for storing temporary variables or other intermediate information during execution of instructions to be executed by processor 505. Computer system 500 further includes a read only memory (ROM) 504 or other static storage device coupled to bus 502 for storing static information and instructions for processor 505. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 505. Another type of user input device is cursor control 516, such as a mouse, a trackball, or cursor direction keys for communicating direction information and command selections to processor 505 and for controlling cursor movement on display 512. This input device typically has two degrees of freedom in two axes, a first axis (e.g., x) and a second axis (e.g., y), that allows the device to specify positions in a plane.

As described elsewhere herein, XML-LDAP transformation is performed by computer system 500 in response to processor 505 executing one or more sequences of one or more instructions contained in main memory 506. Such instructions may be read into main memory 506 from another computer-readable medium, such as storage device 510. Execution of the sequences of instructions contained in main memory 506 causes processor 505 to perform the process steps described herein and illustrated in FIG. 1B. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 505 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 505 retrieves and executes the instructions. The instructions received by main memory 506 may optionally be stored on storage device 510 either before or after execution by processor 505.

Computer system 500 also includes a communication interface 515 coupled to bus 502. Communication interface 515 provides a two-way data communication coupling to a network link 520 that is connected to a local network 522. Local network 522 may interconnect multiple computers (as described above). For example, communication interface 515 may be an integrated services digital network (ISDN) card or a modem to provide a data communication connection to a corresponding type of telephone line. As another example, communication interface 515 may be a local area network (LAN) card to provide a data communication connection to a compatible LAN. Wireless links may also be implemented. In any such implementation, communication interface 515 sends and receives electrical, electromagnetic or optical signals that carry digital data streams representing various types of information.

Network link 520 typically provides data communication through one or more networks to other data devices. For example, network link 520 may provide a connection through local network 522 to a host computer 525 or to data equipment operated by an Internet Service Provider (ISP) 526. ISP 526 in turn provides data communication services through the world wide packet data communication network 524, commonly referred to as the "Internet". Local network 522 and network 524 both use electrical, electromagnetic or optical signals that carry digital data streams. The signals through the various networks and the signals on network link 520 and through communication interface 515, which carry the digital data to and from computer system 500, are exemplary forms of carrier waves transporting the information.

Computer system 500 can send messages and receive data, including program code, through the network(s), network link 520 and communication interface 515. In the Internet example, computer 550 might transmit and/or receive an LDAP schema 113 through Internet 524, ISP 526, local network 522 and communication interface 515. The instructions for performing the method of FIG. 1B may be executed by processor 505 as they are received, and/or stored in storage device 510, or other non-volatile storage for later execution. In this manner, computer system 500 may obtain the just-described instructions and any related data in the form of a carrier wave.

Note that FIG. 5A is a very low-level representation of many hardware components of a computer system. Several embodiments have one or more additional software components in main memory 506 as shown in FIG. 5B: Operating System 591 (e.g. Microsoft WINDOWS XP, or Linux) in each of the three computers 110, 120 and 130 (FIG. 1A), Database Server 596 (e.g. Oracle Server v11g for the server computer 120), Java Development Kit 593 (e.g. JDK v6) in each of the three computers 110, 120 and 130 (FIG. 1A), Java XML-Parser 592 (e.g. xmlparser available from Oracle Corporation) in computer 110, LDAP server 595 (e.g. Oracle Identity Management 10g, version 10.1.4.0.1) in computer 120, and XML text editor 597 (e.g. Oracle JDeveloper version 10.1.3.3) in computer 110.

Numerous modifications and adaptations of the embodiments described herein will become apparent to the skilled artisan in view of this disclosure.

A computer-implemented method of transforming schema to ensure compliance with a directory access protocol, comprises (1) receiving a first schema incompatible with the directory access protocol, (2) parsing the first schema to create a first tree in memory, (3) traversing the first tree to create a second tree, (4) storing in a second node in the second tree, second information conforming to the directory access protocol, (5) wherein the second information in the second node is generated based at least partially on first information in a first node in the first tree and a definition of the directory access protocol and (6) preparing a second schema compatible with the directory access protocol based on a plurality of second nodes in the second tree including said second node.

In certain embodiments, a method of the type described in the previous paragraph is used by a web service (running in a web server on a first server computer which communicates with a second server computer running the LDAP server). Depending on the embodiment, the first server and the second server may be both implemented in the same computer or on two different computers. In such embodiments, the web service permits client applications in client computer 130 to add new LDAP data types to the LDAP server at run time (i.e. after the LDAP server is configured and has started normal operation).

Numerous modifications and adaptations of the embodiments described herein are encompassed by the scope of the invention.

What is claimed is:

1. A computer-implemented method of transforming schema, the method comprising:
   a visual editor receiving input lacking information required by a directory access protocol; and
   the visual editor generating an input schema incompatible with the directory access protocol;

wherein the input schema is expressed by the visual editor in a text based markup language;

wherein the input schema is prepared by the visual editor based on a predetermined schema, the predetermined schema defining at least rules and syntax for an element in the input schema to comply with the directory access protocol, the predetermined schema identifying a name for the element as mandatory and a globally unique object identifier for the element as optional;

a transform tool in a computer generating directory information using at least the input schema, and based on at least the predetermined schema to ensure compliance of the directory information with the directory access protocol;

wherein the directory information comprises a fully-qualified name starting from a root, the fully-qualified name being formed by the transform tool string concatenating a path with the name for the element;

wherein the directory information further comprises the globally-unique object identifier for the element, the globally-unique object identifier being created by the transform tool for said element if the input lacks the globally-unique object identifier;

the transform tool supplying as output a directory schema comprising the directory information;

wherein the directory schema is compatible with the directory access protocol;

based on the input schema, generating software to provide an application programming interface (API); and preparing business logic software to invoke the API.

2. The method of claim 1 wherein:

said directory access protocol comprises a lightweight directory access protocol (LDAP); and said text based markup language comprises tags in conformance with an Extensible Markup Language (XML).

3. The method of claim 2 wherein:

said supplying comprises writing the directory schema to a text file; and said text file conforms to at least one rule in a predetermined format.

4. The method of claim 2 wherein:

said supplying comprises passing the directory schema to an LDAP server;

the method further comprises said LDAP server building a directory in conformance with said directory schema;

the method further comprises performing input-output of a plurality of entries in conformance with the input schema, on said directory accessed via said LDAP server.

5. A non-transitory computer-readable storage medium comprising:

instructions comprised in a visual editor to receive input lacking information required by a directory access protocol and to generate an input schema incompatible with the directory access protocol;

wherein the input schema is expressed in a text based markup language;

wherein the input schema is prepared by the visual editor based on a predetermined schema, the predetermined schema defining at least rules and syntax for an element in the input schema to comply with the directory access protocol, the predetermined schema identifying a name for the element as mandatory and a globally unique object identifier for the element as optional;

instructions comprised in a transform tool to supply a directory schema, by generating directory information using at least the input schema, and based on at least the predetermined schema to ensure compliance of the directory information with the directory access protocol;

wherein the directory information comprises a fully-qualified name starting from a root, the fully-qualified name being formed by the transform tool string concatenating a path with the name for the element;

wherein the directory information further comprises the globally-unique object identifier for the element, the globally-unique object identifier being created by the transform tool for said element if the input lacks the globally-unique object identifier;

instructions comprised in the transform tool to supply as output a directory schema comprising the directory information; and wherein the directory schema is compatible with the directory access protocol;

instructions based on the input schema, to generate software to provide an application programming interface (API); and instructions to prepare business logic software to invoke the API.

6. The non-transitory computer-readable storage medium of claim 5 wherein said predetermined schema comprises:

a standard name space identifying a first Uniform Resource Locator (URL) for definitions of a plurality of data types;

a custom name space identifying a second Uniform Resource Locator (URL) for definitions of additional data types; and a target name space identifying a third Uniform Resource Locator (URL) for the directory schema output by the transform tool.

7. The non-transitory computer-readable storage medium of claim 5 wherein said element is hereinafter first element, and wherein the input schema further comprises a second element, and wherein each of the first element and the second element comprise an attribute of a common name, and wherein the method further comprises generating an error message if object identifiers in the first element and the second element, associated with said attribute of said common name, are different.

8. The non-transitory computer-readable storage medium of claim 5 wherein said element is hereinafter first element, and wherein the input schema further comprises a second element, and wherein each of the first element and the second element comprise object identifiers of a common value, and wherein the method further comprises generating an error message if attribute names in the first element and the second element, associated with said object identifiers of said common value, are different.

9. The non-transitory computer-readable storage medium of claim 5 further comprising:

instructions to use a first value of a type in said element to identify a template of software source code from a library of templates; and instructions to use a second value of a name in the element to customize the template identified by use of the first value.

10. The non-transitory computer-readable storage medium of claim 9 wherein:

the software to provide an API is obtained by customization of the template.

11. An apparatus comprising:

means for receiving input lacking information required by a directory access protocol and to generate an input schema incompatible with the directory access protocol;

wherein the input schema is expressed in a text based markup language;

wherein the input schema is prepared by the means for receiving based on a predetermined schema, the predetermined schema defining at least rules and syntax for an element in the input schema to comply with the directory access protocol, the predetermined schema identifying a name for the element as mandatory and a globally unique object identifier for the element as optional;

means for supplying a directory schema, by generating directory information using at least the input schema, and based on at least the predetermined schema to ensure compliance of the directory information with the directory access protocol;

wherein the directory information comprises a fully-qualified name starting from a root, the fully-qualified name being formed by the means for supplying string concatenating a path with the name for the element;

wherein the directory information further comprises the globally-unique object identifier for the element, the globally-unique object identifier being created by the transform tool for said element if the human input lacks the globally-unique object identifier;

wherein the means for supplying supplies as output a directory schema comprising the directory information; and wherein the directory schema is compatible with the directory access protocol;

means for generating software to provide an application programming interface (API), based on the input schema; and means for preparing business logic software to invoke the API.

12. The apparatus of claim 11 further comprising:

means for using a first value of a type in said element to identify a template of software source code from a library of templates; and means for using a second value of a name in the element to customize the template identified by use of the first value.

13. The apparatus of claim 11 wherein:

the software to provide the API is obtained by customization of a template.

* * * * *

UNITED STATES PATENT AND TRADEMARK OFFICE
CERTIFICATE OF CORRECTION

PATENT NO.         : 7,873,678 B2                        Page 1 of 1
APPLICATION NO.    : 11/830644
DATED              : January 18, 2011
INVENTOR(S)        : Christo T. Tonev et al.

It is certified that error appears in the above-identified patent and that said Letters Patent is hereby corrected as shown below:

On sheet 3 of 13, in Figure 3A, Box 303, line 2, delete "COMPARISION" and insert -- COMPARISON --, therefor.

In column 4, line 28-29, delete "and replaced" and insert -- and "-" replaced --, therefor.

In column 7, line 31, delete ""LastModfiedDate"" and insert -- "LastModifiedDate" --, therefor.

In column 9, line 34, delete "3120A-O" and insert -- 312A-O --, therefor.

Signed and Sealed this
Fourth Day of October, 2011

David J. Kappos
*Director of the United States Patent and Trademark Office*